C. I. WRIGHT.
FILTER FOR ATOMIZERS AND OTHER DEVICES.
APPLICATION FILED MAY 7, 1912.
1,088,954.
Patented Mar. 3, 1914.
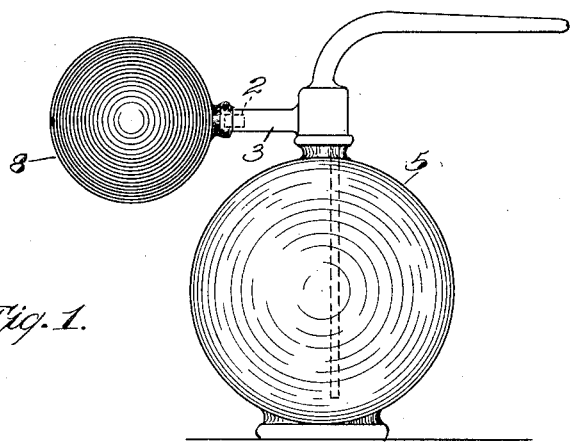
Fig. 1.
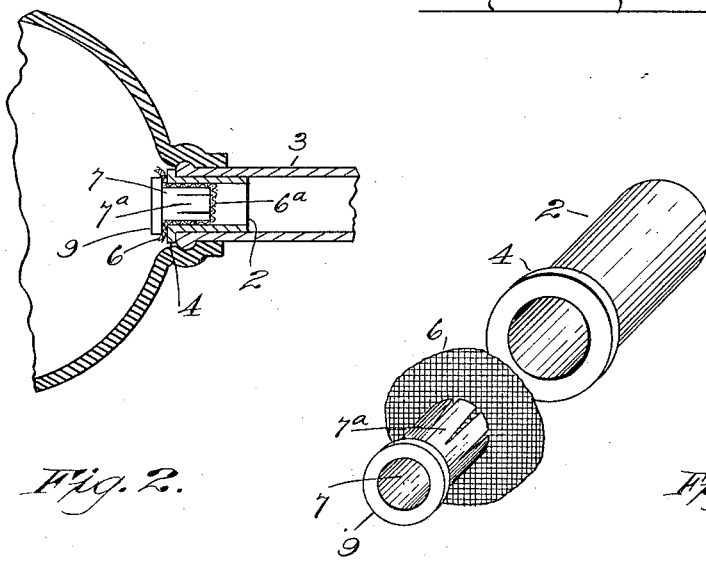
Fig. 2.
Fig. 3.
Witnesses;
F. E. Maynard.
Frances V. Cole
Inventor;
Charles I. Wright,
By G. H. Strong,
his Atty.
COLUMBIA PLANOGRAPH CO., WASHINGTON, D. C.

UNITED STATES PATENT OFFICE.

CHARLES I. WRIGHT, OF TUCSON, ARIZONA.

FILTER FOR ATOMIZERS AND OTHER DEVICES.

1,088,954.

Specification of Letters Patent. Patented Mar. 3, 1914.

Application filed May 7, 1912. Serial No. 695,611.

*To all whom it may concern:*

Be it known that I, CHARLES I. WRIGHT, a citizen of the United States, residing at Tucson, in the county of Pima and State of Arizona, have invented new and useful Improvements in Filters for Atomizers and other Devices, of which the following is a specification.

This invention relates to a filter or screen for atomizers, nebulizers and other apparatus in which it may be desired to mount a screen or filter to catch foreign material or particles before entering into the discharge tube of the same.

The object of the present invention is to provide an effective, simple, renewable and removable screen or filter for devices through which it is necessary to direct a volume of air; the purpose of the invention being to provide a screen, especially designed for atomizers and nebulizers, which will be effective to prevent the passage of small particles of materials from the air compressor or bulb into the conduits of the device.

The invention consists of the parts and the construction and combination of parts as hereinafter more fully described and claimed, having reference to the accompanying drawings, in which—

Figure 1 is a side elevation of a form of atomizer with the device applied. Fig. 2 is an enlarged sectional view of the filter. Fig. 3 is a perspective view of the improved filter before assembled.

The gist of the present invention resides in the peculiar and substantial and efficient construction of a filter applicable to atomizers and other instruments, and in its illustrated embodiment the filter is shown as comprising an external cylinder or barrel 2, of sufficient diameter to snugly but removably fit within an air flue 3 of an atomizer or other implement; the inner end of the barrel 2 being open, and the opposite end of the barrel being provided with a small annular shoulder or flange 4 which is adapted to abut on the adjacent end of the air duct or tube 3 of an atomizer 5.

The screen or filter proper is formed of a suitable fabric of cloth or other material 6, formed in the shape of a bag, the closed end of which extends transversely across the barrel 2, and the cylindrical portion or side of the bag is clamped in the barrel 2 by a bushing or expander 7 of such a diameter as to spread the bag 6 into snug contact with the interior of the tube 3; the expander thus serving as a means for holding the bag 6 in expanded position so that the transverse end of the screen, as 6ª, forms a baffle stop to impede particles of material flowing into the air tube 3 when the bulb 8 of the atomizer is compressed to force air into the atomizer. The expander 7 is shown as having its body portion longitudinally severed so that its sections 7ª can expand, and the outer end of the expander 7 is provided with a shoulder or annular flange 9 to abut against the adjacent shoulder 4 of the barrel 2 of the screen.

By the present construction whenever it is observed that air does not flow freely through the atomizer 5, the operator or individual possessing the device simply has to remove the bulb 8, thereby exposing that portion of the screen which projects from the end of the air tube 3 and may readily remove the screen from the atomizer when, by blowing against the fibrous diaphragm 6ª, the particles which have been collected thereon may be readily dislodged and the screen again adjusted in its proper position.

An important feature of the invention is that by reason of its peculiar construction it is readily possible to withdraw the expander 7 from the barrel 2 so that the fibrous screen 6 may be removed and a new one of the same or different mesh may be inserted between the telescopic screen sections 2 and 7.

The present invention is an improvement in screens for the separation of fine particles of material from air during the movement of the latter through implements, and by reason of its simplicity of construction, the operator upon finding that there is a loss of air flow from the atomizer, may very quickly and easily dislodge the collected particles of material caught in the screen and immediately proceed with efficient use of the atomizer.

Having thus described my invention, what I claim and desire to secure by Letters Patent is—

In a detachable filter member for atomizers, in combination, a cylindrical member having a shoulder at one end, a hollow expander adapted to fit within said cylindrical member, one end of said expander being split longitudinally thereof on several lines for substantially its entire length to form spring arms, a shoulder on the other end, a foraminous medium adapted to be placed over the split end of the expander and extend between it and the cylindrical member, said screen being held taut and firmly in position by the expansion of the spring arms of the expander.

In testimony whereof I have hereunto set my hand in the presence of two subscribing witnesses.

CHARLES I. WRIGHT.

Witnesses:
 ANNA MARTENS,
 NORMAN HELGREN.